UNITED STATES PATENT OFFICE.

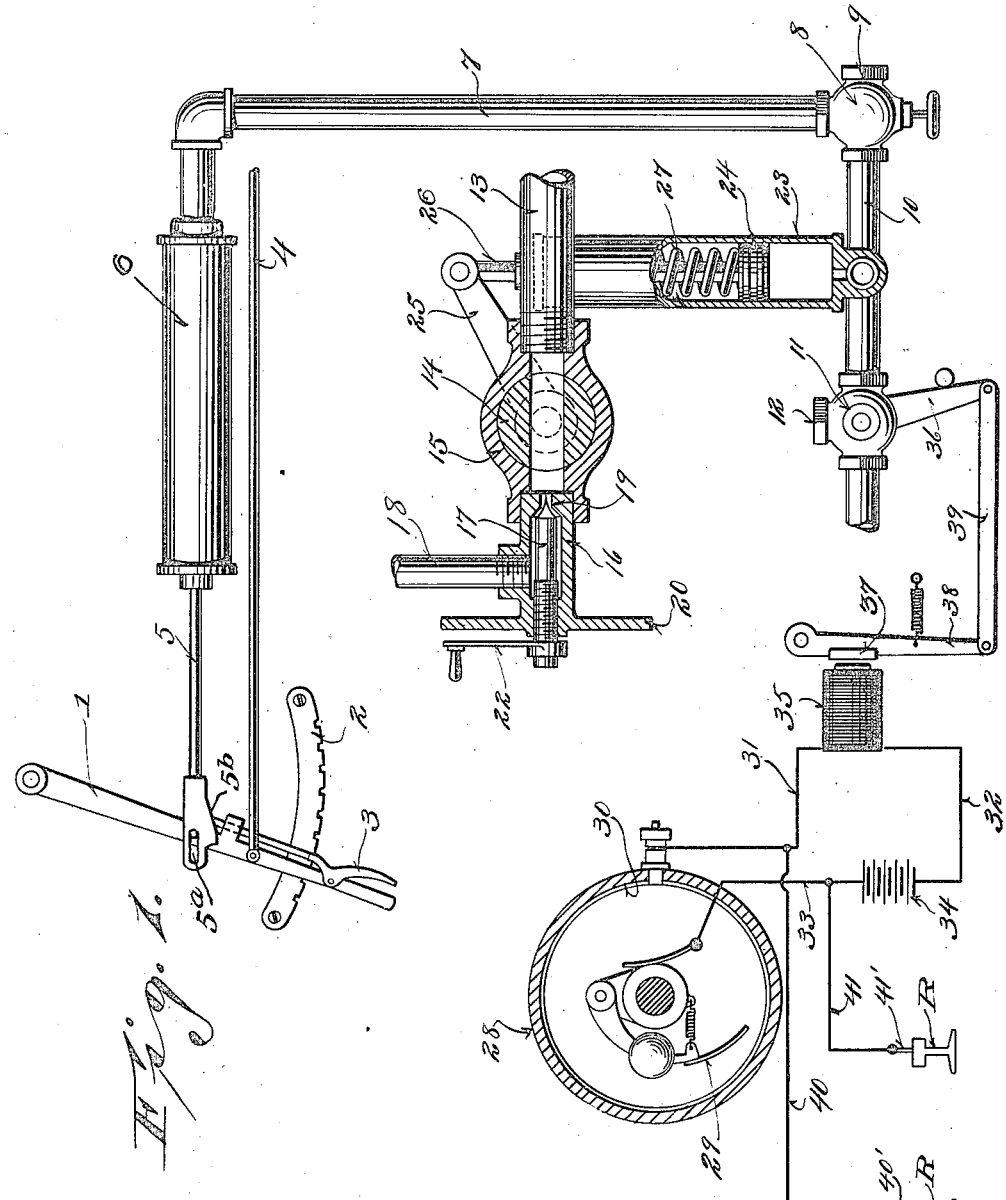

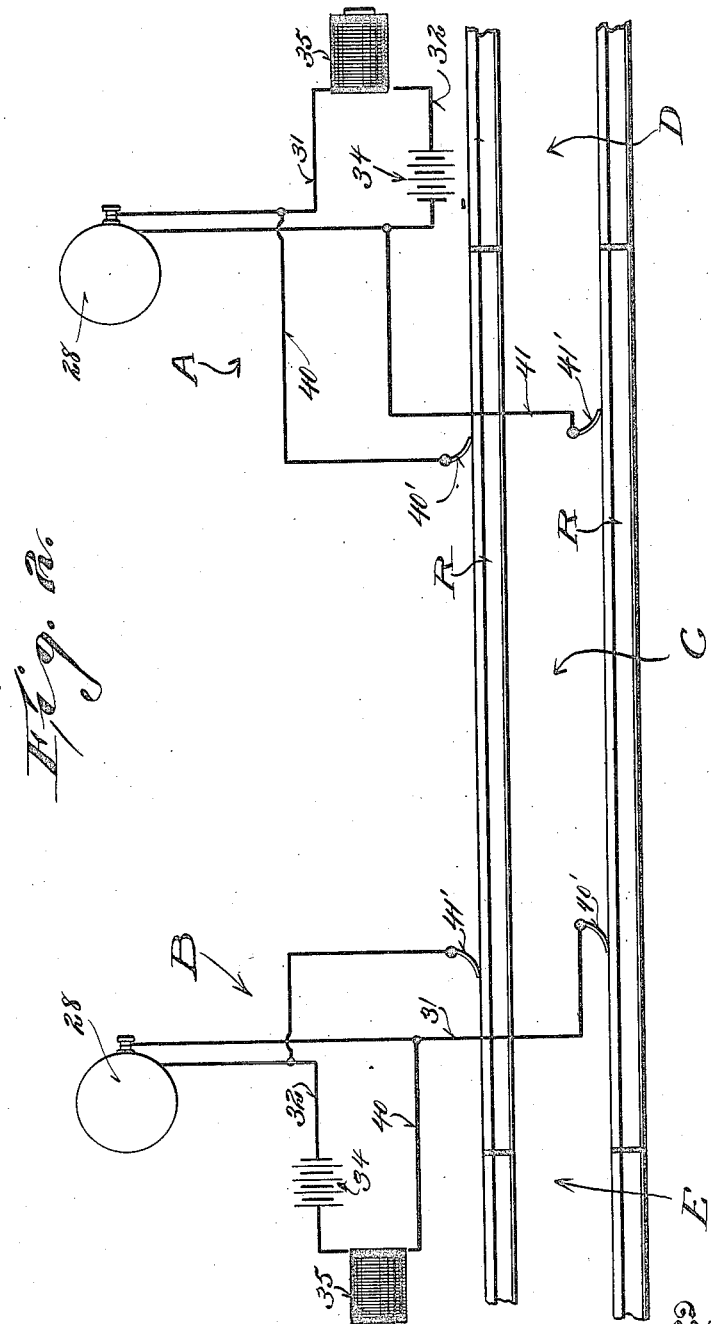

FREDERICK STANLEY PERKINS, OF MILWAUKEE, WISCONSIN.

VEHICLE CONTROL APPARATUS.

1,413,871.  Specification of Letters Patent.  Patented Apr. 25, 1922.

Application filed May 18, 1920. Serial No. 382,351.

*To all whom it may concern:*

Be it known that I, FREDERICK STANLEY PERKINS, a citizen of the United States, and resident of Milwaukee, in the county of Milwaukee and State of Wisconsin, have invented certain new and useful Improvements in Vehicle Control Apparatus; and I do hereby declare that the following is a full, clear, and exact description thereof.

My invention relates to new and useful improvements in controlling apparatus, particularly those for use on railway trains and similar vehicles.

It is one of the primary purposes of my improved system to automatically stop or retard the speed of movement of the vehicle with which it is used when the vehicle speed has reached or passed a predetermined rate.

Another primary object of the invention is to provide an apparatus which can be used on the locomotives and cars of railway and similar trains so that when two trains arrive in predetermined relations, for instance in the same signal block, the air brakes will be automatically set to stop the trains.

A further object of the invention is to provide either mechanical or manual means for controlling the throttle of a locomotive, or the like part of any vehicle, together with means for stopping or retarding movement of the vehicle, both the mechanical throttle control means and stopping or retarding means being automatically actuated under certain conditions, as for instance when the vehicle speed reaches or passes a predetermined rate.

Still another object is to provide an apparatus which can be used in connection with the usual air brake system of railway trains, the apparatus including an arrangement for regulating the quickness with which the air brakes will be set on trains of different lengths and containing different numbers of air braked cars.

Another object of the invention is to provide means whereby the different controlling parts of the system may be automatically actuated by electrical devices.

With these and other objects in view, the invention resides in the novel features of construction, combination and arrangement of parts which will be hereinafter more particularly described and claimed.

In the accompanying drawings:

Figure 1 represents a semi-diagrammatic view of the various elements forming part of the improved system, and Figure 2 is a diagrammatic view showing the electrical system of a pair of locomotives or other propelling vehicles disposed on the same track which have arrived in the same signal block.

Inasmuch as my invention is capable of use on or with many kinds of vehicles, including ships, and is designed under all conditions for preventing collisions and controlling speeds, I have not illustrated any particular method of assembling the various devices forming part of the system on any vehicle except that the accompanying drawings indicate broadly the manner of use on vehicles which run on tracks. For this reason various changes may be made in the form and proportion of the different devices in the system and in their arrangement with respect to each other, without departing from the principles of the invention or sacrificing any of its advantages.

Referring more particularly to the drawings, the reference character 1 denotes a throttle lever held against accidental shifting by the usual toothed sector 2 and latch dog 3 and connected with a throttle or similar speed regulating device (not shown) through a rod 4. This lever 1 is designed to be manually actuated in the ordinary manner or mechanically moved by a piston, the rod 5 of which is connected therewith. When the rod 5 is moved to the left the lever 1 is moved to close the throttle, the latch 3 moving over the notches in the sector 2. When the rod 5 is moved to the right the pin and slot connection 5$^a$ permits the inclined surface 5$^b$ to release the latch 3 so that the lever 1 may be moved to the right to open the throttle. The piston is located in a pneumatic cylinder 6, fluid being supplied thereto through a pipe 7, said pipe being connected with a 3-way valve 8, one side of the same having a bleed 9 whereas the other side has a supply pipe 10 connected thereto. This supply pipe 10 extends to the source of air supply which furnishes compressed air to the usual air brakes.

By manipulating the valve 8 the cylinder 6 may be connected with the air supply through the pipe 10 or open to the atmosphere through the bleed 9. In the first case, of course, the throttle lever 1 will be under pneumatic control, while in the second instance said lever will be wholly under manual control. Passage of air through the supply pipe 10 is automatically regulated by a second 3-way valve 11, the same having a bleed 12 so that the throttle lever 1 may be manually actuated when the same is open and the valve 8 establishes a communication between the pipes 7 and 10. However, when said valve 8 is in its last mentioned position and the bleed 12 is open, nevertheless the parts are in such relation that the throttle lever 1 will be pneumatically shifted when the valve 11 is automatically actuated to close the bleed 12 and establish communication through the pipe 10 from the source of air supply.

When the apparatus is used on railway trains or with other vehicles which are stopped or retarded in movement by means of pneumatically controlled brakes, air is released from the brakes (not shown) through an outlet pipe 13. This pipe 13 communicates with the passage through a control valve 14 which is rotatably mounted in a valve casing 15, this casing 15 in turn being connected with the casing 16 of a regulating valve 17. The casing 16 has an escape pipe 18 and the valve 17 therein is adapted to regulate the size of a discharge orifice 19 so that the flow of air from the pipe 13 and through the valve casing 15 is readily controlled. The casing 16 carries a dial plate 20, through the center of which the stem of the valve 17 extends and has a combination handle and indicator 22 fixed thereto. By means of this indicator and handle the valve 17 may be actuated to vary the size of the orifice 19.

This regulating valve 17 is provided so that proper actuation of the air brakes may be readily procured regardless of the length of the train on which the apparatus is used. It is obvious that on a short train having only a small number of cars, the brakes will be too quickly set if the air is permitted to be discharged in a large volume. On a longer train the air can be released much more quickly without detrimental effects. Thus when the train on which the apparatus is used is composed of a few cars, the orifice 19 is relatively small, whereas if the train is long, the valve 17 may be adjusted to procure a large orifice 19.

The control valve 14 is moved to open position as shown in Figure 1 to permit an escape of air from the brakes by pneumatic means, the air for which is furnished by the hereinbefore mentioned source of supply which enters the supply pipe 10. This means includes a fluid cylinder 23, one end of which is in communication with said pipe 10, a piston 24, and a crank 25 to which the piston rod 26 is pivoted. As shown this crank is attached to the valve 14 and is movable by reciprocation of the piston 24. In other words when air is admitted to the cylinder 23 the piston 24 will move in a direction to open the valve 14, and when the air pressure is cut off, an expansile spring 27 returns the valve 14 to closed position.

The air valve 11 which controls the flow to the cylinders 6 and 23 is actuated by electrical means controlled selectively by a suitable governor 28 or by reason of the arriving of two trains in predetermined positions. The governor 28 is operated by a moving part of the vehicle and upon the speed of the latter being raised beyond a predetermined rate, a movable switch arm 29 is thrown into engagement with a contact ring 30 so that a circuit is made through these parts, wires 31, 32 and 33 and a battery 34 to an electromagnet 35. The energization of this magnet causes a suitable means to shift a crank 36 connected to the valve 11. In the depicted embodiment of the invention the electromagnet armature 37 is carried by a lever 38 which in turn is linked as at 39 to this crank 36. It is obvious, however, that any other desired means may be employed for transmitting the power exerted by the electromagnet 35 to the valve actuated crank 36.

The circuit wire 31, when the invention is used in connection with railway cars, or the like, is connected with the conductor alongside one of the rails R through a wire 40 and a brush 40', the other circuit wire being similarly connected with the conductor alongside the other rail R by a wire 41 and a corresponding brush 41'. In Figure 2 the herein described parts of the electrical circuits are shown in diagrammatic form and as being carried by a train A. Identical electrical mechanism is also carried by the train B, both of which trains are located on the same track and in the same signal block C, the train A just having left the signal block D, whereas the train B has just left block E. As the brushes 40' and 41' carried by each train are engaged with the track rails R it will be seen that the batteries are connected in series and an electrical circuit is completed through both mechanisms so that the electromagnets 35 are simultaneously energized. For example assuming that the batteries 34 are each connected with their positive terminals adjacent to the electromagnets 35, when both trains enter the block C, current will pass from the battery 34 on the train A through the electromagnet, wires 31 and 40, and brush 40' through the conductor alongside the rail to the brush 41' carried by train B through the wire 32, battery 34, electromagnet 35, wires 40 and 31, brush 40' through the conductor alongside the other rail, brush 41' on train A back to the source. Both electromagnets will thus be energized and the valve 11 will be operated to admit compressed air to operate the valve 14 for setting the brakes. The parts will be held in this position as long as the two trains are in the same block. Obviously as soon as the magnets become active, the trains will be brought to an immediate stop owing to the fact that the brakes are automatically set and the brakes will remain set as long as the two trains occupy the block or until the brakes are manually released. When either one of the trains leaves the block C, the magnets 35 will immediately become de-energized with the consequent release of the brakes.

It will be understood that the bleed 9 is for the purpose of permitting the throttle to be operated manually when desired. When the valve 8 is moved to place the bleed 9 in communication with the cylinder 6, the latter will be open to the atmosphere and under manual control only. It will be understood, of course, that when the three-way valve 8 is operated to connect the cylinder 6, with the atmosphere, it will, at the same time, shut off communication between the pressure supply pipe 10 and the cylinder 6, as well as the bleed hole 9. The valve 14 and the piston 24, however, will still be under the control of the pneumatic pressure, which is admitted automatically through the valve 11 when the magnet 35 is energized. As soon as the magnet is deenergized, the lever 38 will be retracted by its spring and the valve 11 will be moved so as to cut off the pressure and place the cylinder 23 in communication with the atmosphere through the bleed 12. This will allow the valve 14 to close automatically under the influence of the spring 27. Thus it will be seen that the air brakes are at all times controlled automatically through the electromagnet, regardless of whether the throttle lever is controlled pneumatically or manually.

From the foregoing description taken in connection with the accompanying drawings, it will be obvious that my invention is adapted to automatically operate either when the vehicle on which it is used attains a predetermined speed, or when two vehicles reach predetermined positions with respect to each other. Such an apparatus as this will be found to be of very great benefit and usefulness on railway cars and to reduce accidents, such as collisions, to a minimum.

I claim:

1. In an automatic control system for railway vehicles, an air brake pressure pipe having a port, a valve controlling said port, resilient means for normally urging the valve to closed position, means operable to open said valve, a governor for actuating the valve opening means whenever the vehicle is running faster than a predetermined speed and releasing said valve actuating means when the vehicle is again running below said speed, means for automatically actuating the valve opening means under certain conditions to open the valve and hold it open until said conditions are changed, and means connected with the valve operating means for automatically moving the throttle toward closed position when the valve is opened.

2. In a device of the character described, an air brake pressure pipe for railway vehicles having a port, a valve controlling said port, means for holding said valve normally closed, fluid pressure operable means to open said valve, a second valve for admitting fluid pressure to the means for operating the first valve, means for opening the second valve whenever the vehicle is running faster than a predetermined speed, and for shutting it when the vehicle is again running below said speed, and means automatically operable when another train is in the same block to open the second valve and hold it open.

3. In an automatic control system for railway vehicles, an air brake pressure pipe having a port, a valve controlling said port, means for holding said valve normally closed, fluid pressure operable means to open said valve, a second valve for admitting fluid pressure to the means for operating the first valve, means for opening the second valve whenever the vehicle is running faster than a predetermined speed, and for shutting it when the vehicle is again running below said speed, means automatically operable when another train is in the same block to open the second valve and hold it open, and means connected with the valve operating means for automatically moving the throttle toward closed position when the valve is open.

4. In an automatic control system for railway trains, an air brake pressure pipe having a port, a valve controlling said port, means for holding said valve normally closed, fluid pressure operable means to open said valve, a second valve for admitting fluid pressure to the means for operating the first valve, an electromagnet operable when energized to open the second valve, means for closing the same when the magnet is deenergized, means for closing a circuit through said magnet whenever the train is running faster than a predetermined speed, and opening said circuit when the train is again running below said speed, and means automatically operable when another train is in the same block to close the circuit through the magnet and hold it closed.

5. In an automatic control system for railway trains, an air brake pressure pipe having a port, a valve controlling said port, means for holding said valve normally closed, fluid pressure operable means to open said valve, a second valve for admitting fluid pressure to the means for operating the first valve, an electromagnet operable when energized to open the second valve, means for closing the same when the magnet is deenergized, means for closing the circuit through said magnet whenever the train is running faster than a predetermined speed, and opening said circuit when the train is again running below said speed, means automatically operable when another train is in the same block to close the circuit through the magnet and hold it closed, and pneumatic means in communication with the second valve for automatically moving the throttle toward closed position when the valve is opened.

6. In a device of the character described, an air brake pressure pipe for railway vehicles having a port, a valve controlling said port, means for holding said valve normally closed, fluid pressure operable means to open said valve, a second valve for admitting fluid pressure to the means for operating the first valve, means for opening the second valve whenever the vehicle is running faster than a predetermined speed, and for shutting it when the vehicle is again running below said speed, means automatically operable when another train is in the same block to open the second valve and hold it open, means connected with the valve operating means for automatically moving the throttle toward closed position when the valve is open, and manually operable means to render the automatic throttle controlling means inoperative.

7. In an apparatus of the class described, pneumatic means for regulating the propelling power of a vehicle, manual means for regulating the same, means for selectively placing either the pneumatic or manual means in operation, pneumatic means for stopping or retarding the movement of said vehicle, an electrically controlled means for actuating either the last named means, or the last named means and the first mentioned means, depending upon the position of the selective means, whenever the vehicle reaches a predetermined speed.

8. In an automatically controlled system for railway trains, an air brake pressure pipe having a port, a valve controlling said port, means for holding said valve normally closed, fluid pressure operable means to open said valve, manually operable means for adjusting the rate of emission of fluid pressure through said port when the valve is open, a second valve for admitting fluid pressure to the means for operating the first valve, an electromagnet operable when energized to open the second valve, means for closing the same when the magnet is deenergized, means for closing a circuit through said magnet whenever the train is running faster than a predetermined speed, and opening said circuit when the vehicle is again running below said speed, means automatically operable when another train is in the same block to close the circuit through the magnet, and hold it closed, and pneumatic means in communication with said second valve for automatically moving the throttle toward closed position when the valve is opened.

9. In a device of the character described, pneumatic means for retarding or stopping a train, an electromagnet for actuating said pneumatic means, means for closing an electric circuit through said magnet whenever the speed of the train reaches a predetermined maximum and for interrupting it when the speed is reduced below said maximum, additional means operable when another train is in the same block for positively closing the circuit through said magnet and keeping it closed.

In testimony that I claim the foregoing I have hereunto set my hand at Milwaukee, in the county of Milwaukee and State of Wisconsin.

FREDERICK STANLEY PERKINS.